G. R. PARANTEAU.
KNIFE FOR FRUIT PITTING MACHINES.
APPLICATION FILED MAR. 16, 1921.
1,392,519.
Patented Oct. 4, 1921.
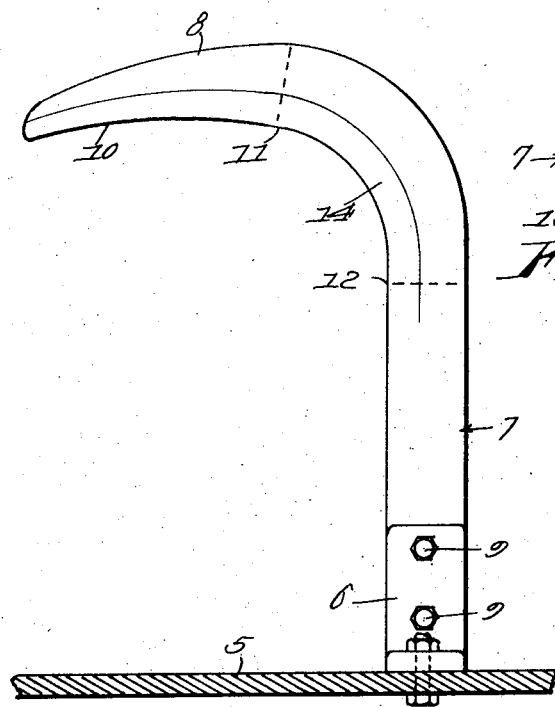
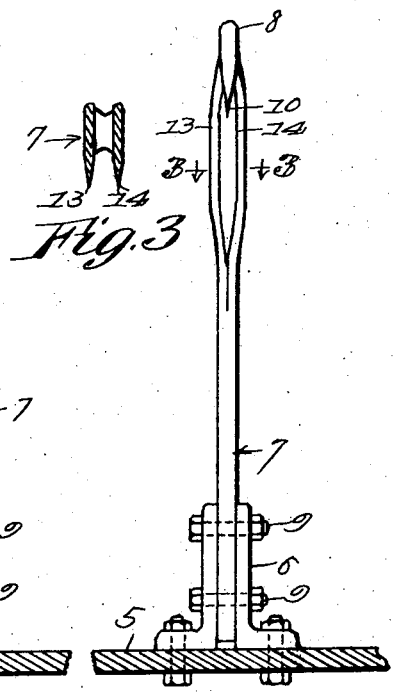
INVENTOR
BY George R. Paranteau,
Frank A. Ahnman,
ATTORNEY

UNITED STATES PATENT OFFICE.

GEORGE R. PARANTEAU, OF VENTURA, CALIFORNIA.

KNIFE FOR FRUIT-PITTING MACHINES.

1,392,519.   Specification of Letters Patent.   Patented Oct. 4, 1921.

Application filed March 16, 1921. Serial No. 452,873.

*To all whom it may concern:*

Be it known that I, GEORGE R. PARANTEAU, a citizen of the United States of America, and resident of Ventura, in the county of Ventura and State of California, have invented certain new and useful Improvements in Knives for Fruit-Pitting Machines, of which the following is a specification.

This invention relates to knives for fruit pitting machines and has for its object the provision of novel means for slitting fruit and for presenting pit resisting portions operative to arrest the pit and dislodge it from the fruit while the fruit is being carried past the knife. While this invention is primarily intended to be used as a part of fruit pitting machines similar to those embodied in my application for patent filed Sept. 21, 1920, Serial Number 411,841, it is capable of use separate therefrom and as an accessory to other fruit pitting or treating machinery, and I do not therefore wish to be limited with respect to its installation or application.

It is an object of the invention, therefore, to produce a knife of such configuration and characteristic as to have a cutting edge engage fruit as it is ascending or carried by a wheel or other conveyer for the purpose of slitting the fruit circumferentially and to then present pit engaging portions which are contacted during the further movement of the fruit so that the pits are dislodged from the fruit without liability of the pit adhering to one or the other sections of the fruit being carried.

It has been found in practice that a device made in accordance with the invention is more satisfactory and more positive in its action than those of known construction and it is comparatively simple in form and inexpensive.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a side elevation of a knife embodying the invention;

Fig. 2 illustrates a front view thereof; and

Fig. 3 illustrates a sectional view on the line 3—3 of Fig. 1.

I have shown the invention as applied to a bed plate 5 and held in place thereon by brackets 6 between which the shank 7 of the knife 8 is secured by fastenings 9 such as bolts.

The cutting or operating portion of the knife may be said to consist of an approximately horizontally disposed blade 10 which, however, is slightly curved to conform to the movement of a circular carrier such as is shown in the aforesaid application. The approximately horizontally disposed portion of the blade has a single cutting edge which single portion terminates at approximately the line 11. From the line 11 to a point approximately the line 12, the knife has a double cutting edge 13 and 14 in such spaced relation to each other as to cause a spreading of the two halves of fruit which had previously been cut by the single blade, and owing to the fact that the two cutting edges gradually diverge from the single cutting edge, they perform what might be termed a stripping action in severing the fruit from the pit, while at the same time the pit is caused to bear against two points of resistance comprising the cutting edges 13 and 14, a condition which prevents any wabbling of the pit or any tendency to adhere to one half of the fruit rather than to the other half thereof, and in fact, the knife is so effective in this regard that the pit is dislodged from the fruit as the fruit is carried by the conveyer.

I claim:

1. In a knife for fruit pitting machines, a shank having a curved blade terminating in a substantially horizontally disposed portion, the last mentioned portion being single and terminating in a dual blade having a space between the cutting edges thereof.

2. In a knife for fruit pitting machines, a shank having means for anchoring the same, a curved blade terminating in a portion extending approximately at right angles to the shank, the said knife having a double cutting edge, the said double edge diverging from the single cutting edge and presenting resistance points for engaging pits of fruit being cut.

3. In a knife for fruit pitting machines, a shank having means of anchorage, the said shank having a blade the outer portion of which has a single cutting edge and the intermediate portion of which has a double cutting edge merging with the single cutting edge.

4. In a knife for fruit pitting machines, a shank having means of anchorage, the said shank having a blade the outer portion of which has a single cutting edge and the intermediate portion of which has a double cutting edge converging to and joining the portion having the single cutting edge.

5. In a knife for fruit pitting machines a blade, a portion of which has a single cutting edge merging with a portion which has a double cutting edge, and means for holding the blade.

6. In a knife for fruit pitting machines, a shank having means of anchorage, the said shank having a blade, a portion of which has a single cutting edge merging with a double cutting edge.

GEORGE R. PARANTEAU.